June 21, 1927.
J. F. O'CONNOR
1,632,914
FRICTION SHOCK ABSORBING MECHANISM
Original Filed Aug. 31, 1922    2 Sheets-Sheet 2
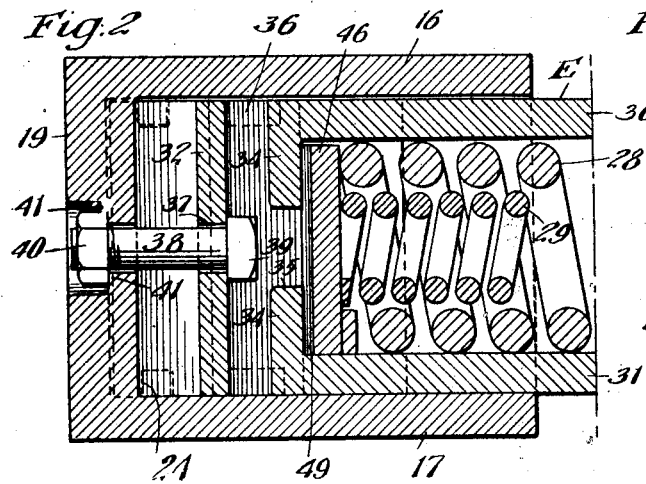
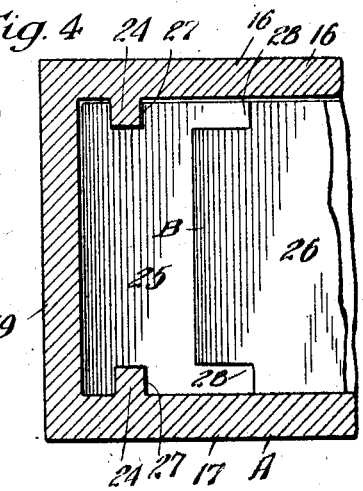
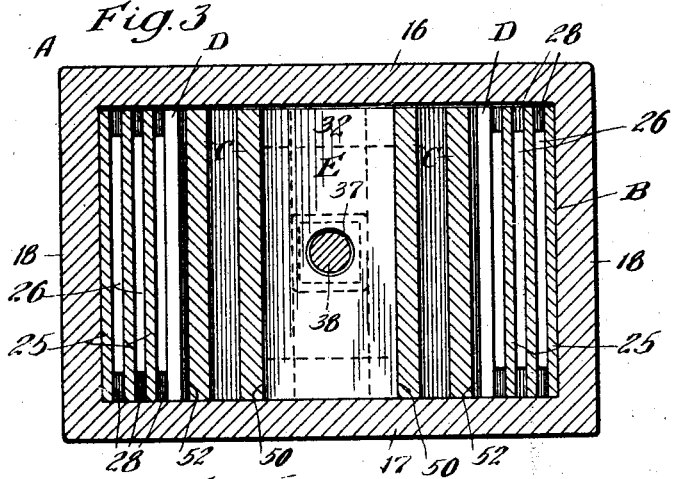
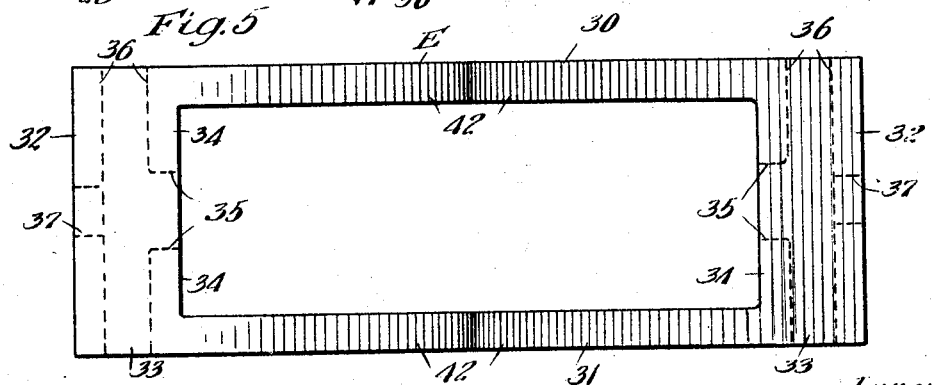
Witnesses
Wm. Geiger
Inventor
John F. O'Connor
By Geo. I. Haight
His Atty.

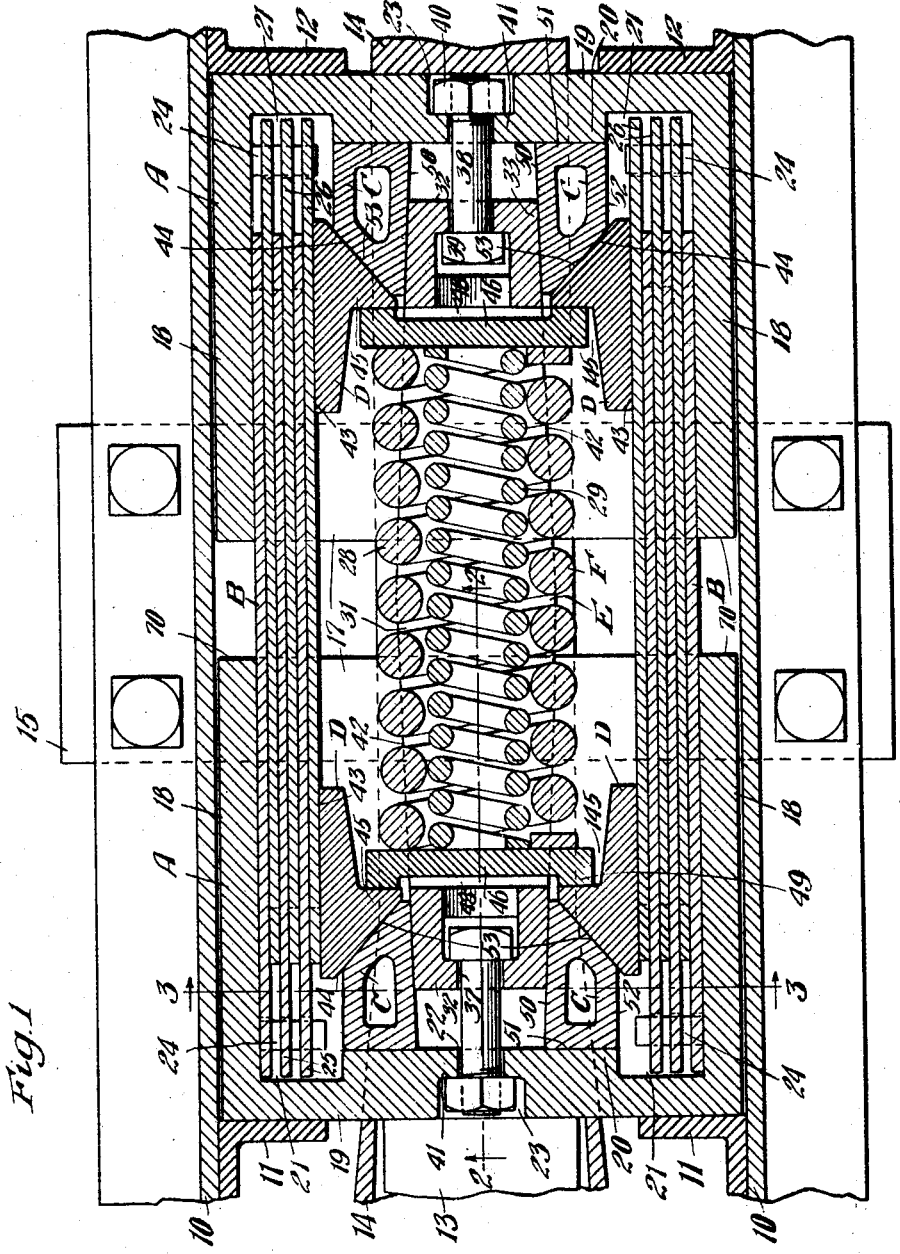

Patented June 21, 1927.

1,632,914

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed August 31, 1922, Serial No. 585,448. Renewed February 17, 1927.

My invention relates to improvements in friction shock absorbing mechanisms.

One object of the invention is to provide a friction shock absorbing mechanism, more particularly adapted for railway draft rigging, which is simple and efficient and wherein is obtained a high capacity, due to the large friction areas provided.

Another object of the invention is to provide a friction shock absorbing mechanism of the intercalated plate type including a differential wedge action, whereby quick and positive release of the parts is assured.

Other objects of the invention will more clearly appear from the description herein following.

In the drawings forming a part of the specification, Fig. 1 shows a horizontal longitudinal sectional view of a portion of a railway draft rigging showing my improvements in connection therewith. Fig. 2 shows a vertical longitudinal sectional view, substantially on the line 2—2 of Fig. 1. Fig. 3 shows a vertical, transverse sectional view substantially on the line 3—3 of Fig. 1. Fig. 4 is a vertical longitudinal sectional view of the end of the follower casing; illustrating the connection between the friction plates and the follower. And Fig. 5 is a side elevation of the tapered column.

In said drawings, 10—10 indicate channel-shaped draft sills, to the inner faces of which are secured, front and rear stop lugs 11 and 12. A portion of a draw bar is indicated at 13, to which, as shown, is attached the U-shaped yoke 14, of the usual construction. The shock absorbing mechanism proper, hereinafter described, including the front and rear follower casings, is disposed within the yoke. The movable parts of the draft rigging are adapted to be supported by a detachable saddle plate 15.

The improved shock absorbing mechanism, as shown, comprises front and rear follower casings A—A, two groups of friction plates B—B, wedge blocks C—C, wedge shoes D—D, a tapered column E, and a spring resistance F.

The front and rear follower casings A, are of similar construction and each comprises upper and lower walls 16 and 17, connected by vertically extending side walls 18—18. The rear end of each follower casing A is closed by a wall 19, connected to the upper and lower walls 16 and 17, and the side walls 18. Said rear wall 19 of each follower casing A, is thickened at the center to provide the inwardly extending abutment 20, which cooperates with the wedge blocks C. The abutment 20 extends from the upper wall 16 to the lower wall 17 of the casing, but is spaced from the side walls 18 of the casing to provide recesses 21—21 adapted to receive the ends of the friction plates B. The wall 19 and the abutment 20 are centrally perforated as shown at 22 to receive a retaining bolt hereinafter described. At the outer face in alinement with the recess 22, the rear wall 19 is provided with an enlarged recess 23 to receive the nut of the retaining bolt. The upper wall 16 and the lower wall 17 of each casing is provided respectively with a projecting rib 24. As shown in Fig. 1, this rib projects inwardly from the side wall toward the enlargement 20, terminating a short distance from the same, thus providing a space through which the ends of the plates B may be inserted in the recess 21. It will be noted that the front and rear follower casings A, house the friction plates B, wedges C, wedge shoes D, column E and the spring resistance F and that the rear wall 19 of each casing is adapted to abut the corresponding front or rear follower stops.

As shown in the drawings, the friction plates B are divided into two groups oppositely located and in the specific embodiment illustrated, each group comprises six plates, but it is obvious that a greater or lesser number may be made use of. Alternate plates of each group comprise a set of plates 25 connected to the front follower and a set of plates 26 connected to the rear follower, said plates 25 and 26 being so arranged that the ends of the plates 25 are normally spaced from the inner face of the wall 19 of the rear follower A a distance greater than the distance between the inner ends 70 of the casings A, and the ends of the plates 26 are spaced a similar distance from the inner face of the wall 19 of the front follower. By this arrangement the ends 70 of the casings are caused to abut before the plates contact with the end walls of the followers, the follower casings thereby assuming the full load and transmitting the same to the draft sills. Each of the plates 25 and 26 is provided at the upper and lower edge, near one end thereof, with notches 27 to engage with the ribs 24 on the followers, to thereby connect the plates to move with their respective followers. Upon reference to Fig. 4, it will be noted that the free ends of the plates 25 and 26 are recessed at the upper and lower edges as shown at 28. These recessed portions 28 are provided so that the ends of the plates may move inwardly beyond the ribs 24 during the compression of the mechanism and clear the ribs, but the plates are prevented from contacting with said walls due to their movement being limited by the engagement of inner ends of the casings A as previously described.

The spring resistance F comprises an outer comparatively heavy coiled spring 28, and an inner lighter spring 29. The springs 28 and 29 are housed within the column E.

The column E as most clearly shown in Figs. 1, 2 and 5 is of hollow box-like construction, being tapered outwardly from the center to its opposite ends, as indicated at 42—42 in Fig. 1. Said column comprises upper and lower walls 30 and 31 connected by end walls 32—32, and narrow side walls 33—33. As shown in Figs. 2 and 5, the side walls 33—33 of the column E are connected by transversely extending inner walls 34—34 which are also connected to the upper and lower walls 30 and 31 of the column, but are spaced apart centrally as indicated at 35 to provide an opening for insertion of the retaining bolt. It will be noted that the arrangement of the walls 32—32 and walls 34—34 is such that a space is provided therebetween as clearly shown in Figs. 2 and 5 and indicated by 36. Upon reference to Fig. 5, it will be noted that the arrangement of the narrow vertical walls 33 provides large rectangular openings in the sides of the column E to permit the springs to be inserted and to accommodate the coils of the heavy spring 28. The walls 32—32 are provided with central perforations 37 to receive the retaining bolts 38. As shown in Figs. 1 and 2, the retaining bolts 38 hold the column E in assembled relation with the followers A, by engaging the head 39 of each bolt with the inner face of the wall 32 and the nut 40 of each bolt with the inner face 41 of the recess 23 of each follower plate A. It will be noted that the tapering construction of the column E provides outer vertically extending wedge-shaped ends which co-act with the wedge blocks C as hereinafter described.

The wedge shoes D are arranged in pairs at opposite ends of the spring resistance F and each shoe D comprises an outer flat face 43, an inner inclined face 44 of approximately half the length of the outer face 43 and terminating in an inner shoulder 45 formed by the inner portion of the shoe being cut out or recessed as shown at 145. The shoulders 45 form abutments for spring follower plates 46, interposed between the opposite ends of the spring resistance F and the adjacent ends of the shoes D. The follower plates 46 are of rectangular outline and have their outer faces centrally recessed, as shown at 48 to provide vertically extending flanges for abutments 49, which co-act with and bear on the abutment shoulders 45 of the wedge shoes D. The space between the flanges 49 is greater than the width of the column E so that a proper clearance is provided, to allow the spring follower plates 46 to move outwardly relatively to the column E from the normal position shown in Fig. 1 to compensate for wear.

The wedge blocks C are four in number in the particular embodiment of the invention herein disclosed and are arranged in pairs at opposite ends of the draft gear co-acting with the respective followers A. The blocks C are of hollow construction as will be evident from reference to Fig. 1 and each is provided with an inner flat face 50, slightly inclined to the longitudinal axis of the gear to correspond with the inclination of the corresponding face 42 of the column E. Each block C is also provided with a rear flat face 51 which engages with the abutment 20 of the follower A and has sliding movement laterally on the same. Opposite the face 50 of each block C, there is is provided a vertically extending flat face 52, connected with the face 50 at the forward end by wedge face portion 53 which is adapted to contact and cooperate with the wedge face 44 on a wedge shoe D. The arrangement of the column E having the tapering ends, the wedge blocks C and the wedge shoe D provides for a differential wedge action which assures quick release of the mechanism.

In the operation of my device, assuming that the gear is buffed, the front follower casing A will be moved rearwardly relatively to the rear follower casing A, thereby moving the wedge blocks C toward each other, causing the wedge shoes which are resisted by the springs 28 and 29, to move outwardly relatively to each other and press laterally on the plates B, thereby increasing the frictional resistance between the plates. After the pressure has been set up between the plates B, the continued movement of the follower A will cause the wedge block C to move further inwardly, and as the same resistance is offered by each tapering end of the column E, the blocks C and the ends of the column E will move the same distance relatively at each end and on account of the wedging action between the column E and the blocks C, the blocks will be simultaneously moved outwardly relatively to the center of the gear, thus causing the engaging wedge faces 44 and 53 to move all of the wedge shoes longitudinally inwardly of the gear. This causes a longitudinal movement of each pair of shoes relatively to the coacting follower, thus compressing the spring resistance F in addition to the compression produced by the relative movement of the followers. During the inward movement of the front follower A, plates 25 of each group are carried therewith and being in frictional contact with the plates 26 under the wedging action of the mechanism, will retard the rearward movement of the front follower E. This sliding movement of the plates continues until the ends 70 of the casings come into contact, whereupon the final load will be transmitted directly through the casings to the draft sills of the car. A similar action will occur when a draft force is applied to the rear follower of the gear. Upon release of the mechanism, it will be obvious that the action of the springs 28 and 29 in expanding will first cause the shoes D to slide relatively to the plates 26, moving therewith the wedge blocks C relatively to the tapering ends of the column E and causing prompt release of the wedge members. It should also be noted that the plates 25 during the compressive action of the mechanism, move relatively to the rear follower A and as the outer plates 25 of each group contact with the inner faces of the side walls 18 of the rear follower A, the rear follower also acts in the capacity of a friction casing. It should also be noted that the wedge shoes D of the front follower A, slide relatively on the inner faces of the plates 26, thereby setting up frictional resistance between the same.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism; the combination with a plurality of groups of intercalated relatively longitudinally movable friction plates; of front and rear followers co-acting with said plates to produce relative movement of the same; means for limiting lateral movement of said plates; a spring resistance between said sets of plates; and wedge-acting means at opposite ends of said spring resistance interposed between the same and the adjacent follower and co-acting with the friction plates, each of said wedge-acting means including a plurality of wedge blocks associated with each follower, and a plurality of co-acting wedge shoes associated with the end of the spring resistance, whereby pressure is set up between said intercalated plates during the compressive action of the mechanism.

2. In a friction shock absorbing mechanism; the combination with front and rear followers; of a plurality of spaced apart groups of intercalated relatively movable friction plates between said followers, alternate plates of each of said groups being connected to the front and rear followers respectively and movable therewith; lateral abutment means co-acting with said groups of plates; a spring resistance between said groups of plates; a wedge associated with each follower, said wedge comprising a plurality of wedge blocks slidably mounted relatively to said follower; and a plurality of wedge shoes interposed between the end of the spring resistance and the adjacent follower co-acting with said wedge, to create pressure on said intercalated plates during compressive action of the mechanism.

3. In a friction shock absorbing mechanism; the combination with a plurality of groups of intercalated relatively movable friction plates; of front and rear followers co-acting with said plates to relatively move the same; abutment means for limiting lateral movement of said plates; a spring resistance between said groups of plates; and differential wedge-acting means at opposite ends of said spring resistance including a wedge column having wedging means at its opposite ends.

4. In a friction shock absorbing mechanism; the combination with front and rear followers; of a plurality of groups of intercalated plates between said followers, said groups being spaced apart laterally and alternate plates of each group being movable by contact with the front and rear followers, respectively; means for resisting lateral outward movement of said plates; a spring resistance between said groups of plates; a plurality of wedge-blocks slidably movable on each follower; a hollow column enclosing said spring resistance and having its opposite ends interposed between the blocks on each follower; and a plurality of wedge shoes at each end of said spring resistance co-acting with said wedge blocks, whereby wedging pressure is transmitted to said intercalated plates, setting up frictional resistance therebetween during the compressive action of said shock absorbing mechanism.

5. In a friction shock absorbing mechanism; the combination with a plurality of groups of intercalated relatively movable friction plates; of front and rear followers co-acting with said plates to relatively move the same; means for holding said plates against lateral outward movement; a spring resistance between said groups of plates; a column having wedging means at its opposite ends; and wedge-acting means at opposite ends of said spring resistance, each wedge-acting means comprising a pair of wedge blocks and a pair of wedge shoes, said blocks bearing on the adjacent follower and co-acting with the wedge shoes and the wedging means on the column, whereby wedging presure is transmitted to said groups of plates when the shock absorbing mechanism operates.

6. In a friction shock absorbing mechanism; the combination with a plurality of groups of intercalated relatively movable friction plates; of front and rear followers co-acting with said plates to relatively move the same; means opposing lateral outward movement of said plates; a spring resistance between said groups of plates; a column having wedging means at its end; and a wedge-acting means between an end of said spring resistance and the adjacent follower, said wedge-acting means comprising a pair of wedge blocks and a pair of wedge shoes, said blocks bearing on the adjacent follower and co-acting with the wedge shoes and the wedging means on the column, whereby a differential wedging action is set up and pressure transmitted to said plates during the compressive action of the mechanism.

7. In a friction shock absorbing mechanism, the combination with front and rear relatively movable follower acting elements, each having spaced longitudinally extending walls disposed on opposite sides of the mechanism; of a centrally disposed lateral pressure resisting means independent of said followers, said centrally disposed means having longitudinally disposed walls on opposite sides of the axis of the mechanism; a group of longitudinally disposed relatively movable intercalated friction plates at each side of the mechanism; lateral pressure creating means co-operating with each group of plates, the group of plates and the lateral pressure creating means at each side of the mechanism being interposed between the walls of the centrally disposed means and the followers at the corresponding side of the mechanism; and means for yieldingly opposing relative movement of the plates of said groups.

In witness that I claim the foregoing I have hereunto subscribed my name this 9th day of Aug., 1922.

JOHN F. O'CONNOR.